US007843347B2

(12) United States Patent
Nikitin et al.

(10) Patent No.: US 7,843,347 B2
(45) Date of Patent: Nov. 30, 2010

(54) NEAR-FIELD AND FAR-FIELD ANTENNA-ASSEMBLY AND DEVICES HAVING SAME

(75) Inventors: Pavel Nikitin, Seattle, WA (US);
Venkata Kodukula, Bothell, WA (US);
Sprague Ackley, Seattle, WA (US); For Sander Lam, Bothell, WA (US)

(73) Assignee: Intermac IP Corp., Everett, WA (US)

( * ) Notice: Subject to any disclaimer, the term of this patent is extended or adjusted under 35 U.S.C. 154(b) by 336 days.

(21) Appl. No.: 12/022,911

(22) Filed: Jan. 30, 2008

(65) Prior Publication Data
US 2009/0189816 A1 Jul. 30, 2009

(51) Int. Cl.
*G08B 13/14* (2006.01)
(52) U.S. Cl. .............. 340/572.7; 340/539.1; 340/568.1; 340/10.1
(58) Field of Classification Search ............. 340/572.7, 340/572.1–572.6, 572.8–572.9, 539.1, 568.1, 340/10.1, 539.11, 825.36, 7.2, 7.51, 7.54
See application file for complete search history.

(56) References Cited

U.S. PATENT DOCUMENTS

| | | | | |
|---|---|---|---|---|
| 5,581,260 | A * | 12/1996 | Newman | 342/374 |
| 6,600,445 | B2 * | 7/2003 | Li | 342/368 |
| 6,917,785 | B2 * | 7/2005 | Chadwick | 455/3.06 |
| 7,027,039 | B1 * | 4/2006 | Henty | 345/173 |
| 2005/0045723 | A1 | 3/2005 | Tsirline et al. | 235/451 |
| 2007/0164868 | A1 | 7/2007 | Deavours et al. | |
| 2008/0007457 | A1 | 1/2008 | Copeland et al. | |
| 2008/0238621 | A1 * | 10/2008 | Rofougaran et al. | 340/10.1 |

OTHER PUBLICATIONS

Balanis, "Antenna Theory: Analysis and Design," John Wiley and Sons, 1997. Reference Book—Available Upon Request.
Bansal, R., Near-Field Magnetic Communication, IEEE Antennas and Propagation Magazine, vol. 46, No. 2, Apr. 2004, pp. 114-115.
Bolomey, J.C. et al., "Engineering Applications of the Modulated Scatterer Technique," Artech House, Boston, London, 2001. Reference Book—Available Upon Request.
Gardio, F., "The World of the Near-Field," Evaluation Engineering, Oct. 2005, Reference Book—Available Upon Request.
Laybros, S., et al., "On Radiating-Zone Boundaries of Short λ/2, and λ Dipoles," IEEE Antennas and Propagation Magazine, vol. 46, No. 5, Oct. 2004, pp. 53-64.

(Continued)

*Primary Examiner*—Daniel Previl
(74) *Attorney, Agent, or Firm*—Seed IP Law Group PLLC

(57) ABSTRACT

Systems, methods, and devices wirelessly communicate in a near-field region and a far-field region. A device may include a near-field antenna and a far-field antenna. The device may be configured to selectively operate in a near-field mode, employing the near-field antenna, and/or in a far-field mode, employing the far-field antenna, and/or in a joint mode, employing both the near-field antenna and the far-field antenna separately or concurrently. One type of device may be a wireless communications data-reader device configured for both near-field and far-field communications. Another type of device may be a wireless communications data-provider device configured for both near-field and far-field communications.

20 Claims, 15 Drawing Sheets

OTHER PUBLICATIONS

Lecklider, T., "The World of the Near Field," http://archive.evaluationengineering.com/archive/articles/1005/1005the_world.asp, download date of Apr. 18, 2008, 8 pages.

Liu, Z., "A 3 Patch Near Field Antenna for Conveyor Bottom Read in RFID Sortation Application," IEEE Antennas and Propagation Society International Symposium 2006, Jul. 9-14, 2006, pp. 1043-1046.

Nikitin, P., et al., "An Overview of Near Field UHF RFID," http://www.ee.washington.edu/faculty/nikitin_pavel/papers/RFID_2007.pdf, 8 pages.

Ortiz, Jr., S., "Is Near-Field Communication Close to Success," IEEE Computer Society vol. 39, No. 3, Mar. 2006, pp. 18-20.

White Paper, "Item-Level Visibility in the Pharmaceutical Supply Chain: A Comparison of HF and UHF RFID Technologies," by Philips Semiconductors, TAGSYS, and Texas Instruments Inc., Jul. 2004, 28 pages.

Convergence Systems Limited—"CS-77 Brickyard™ Near-Field Antenna", 1 page.

Convergence Systems Limited—Products—"CS777 Brickyard Near Field Antenna", retrieved on Apr. 30, 2010 at http://www.convergence.com.hk/products_details.php?id=5, 2 pages.

Impinj, Inc., "UHF GEN 2 RFID Impinj Reader Antenna Products", 2009, 4 pages.

* cited by examiner

1400

```
┌─────────────────────────────────────────────────────┐
│ Wirelessly receive a provider-mode command indicative│ 1402
│                of an operational                    │
└─────────────────────────────────────────────────────┘
                         ↓
┌─────────────────────────────────────────────────────┐
│ Select the operational mode for the wireless data-provider │ 1304
│ communications device based at least upon the received     │
│              provider-mode command                         │
└─────────────────────────────────────────────────────┘
```

```
┌─────────────────────────────────────────────────────┐
│ Select a joint operational mode for a wireless data-provider │ 1502
│                communications device                         │
└─────────────────────────────────────────────────────┘
                         ↓
┌─────────────────────────────────────────────────────┐
│ Emit electromagnetic energy from a near-field antenna responsive │
│ to interrogation by a first wireless data-reader communications  │ 1504
│ device, wherein the wireless data-provider communications device │
│       is within a near-field region of the first wireless data-reader │
│                    communications device                         │
└─────────────────────────────────────────────────────┘
                         ↓
┌─────────────────────────────────────────────────────┐
│ Emit electromagnetic energy from a far-field antenna responsive │
│ to interrogation by a second wireless data-reader communications │ 1506
│ device, wherein the wireless data-provider communications device │
│      is within a far-field region of the second wireless data-reader │
│                    communications device                         │
└─────────────────────────────────────────────────────┘
```

*FIG. 15*

NEAR-FIELD AND FAR-FIELD ANTENNA-ASSEMBLY AND DEVICES HAVING SAME

BACKGROUND

1. Technical Field

This disclosure generally relates to antenna assemblies and more particularly to antenna assemblies having both near-field and far-field characteristics.

2. Description of the Related Art

Wireless communications data-provider devices such as radio frequency identification (RFID) devices operate at various frequencies. Frequencies for RFID devices may, for example, include low frequency (LF 125-134.2 kHz), high frequency (HF 13.56 MHz), and ultra-high frequency (UHF 860-960 MHz).

Low frequency and high frequency RFID systems (LF/HF i.e. 13.56 MHz) are short-range systems based on inductive coupling between respective antennas of a reader and a data-provider device through a magnetic field. Ultra-high frequency (UHF i.e. 860-960 MHz) and microwave (i.e. 2.4 GHz and 5.8 GHz) RFID systems can be long-range systems that use electromagnetic waves propagating between respective antennas of a reader and data-provider device.

UHF RFID systems designed to operate over long distances through electromagnetic wave propagation have several advantages including range compared to LF/HF systems but their performance in general is more susceptible to the presence of various dielectric and conducting objects in the vicinity of the data-provider device.

HF and some UHF RFID systems are designed to operate using magnetic induction and perform over a relatively a short distance. These systems are less susceptible to the presence of various dielectric and conducting objects in the vicinity of the data-provider device, however their limited range severely restricts their broad application.

The nature of electromagnetic wave propagation and magnetic inductance are substantially different and consequently so are their respective tag and reader antenna designs. Due to this physical limitation, there has never existed a system which exhibits the performance characteristics of both near and far field RFID devices.

Near-field RFID may provide a possible solution for item level tagging (ILT) in various industries such as pharmaceutical and retailing industry. Near-field coupling is already being used in such areas of UHF RFID as printer coupler ((tag writer) and for conveyor belt applications. Other near-field HF, UHF, and microwave applications, to name a few, include short range wireless communication, also known as near field communication (NFC), hyperthermia treatment, MRI imaging, detection of buried objects, measuring material properties and various modulated scattering probe techniques.

Far-field RFID is currently providing solutions to many logistics and tracking applications where upwards of hundreds of tags per second can be read over great distances.

There is a need for systems, methods, and devices that may wirelessly communicate both over relatively long distances such as with a far-field wireless communications device and over relatively short distances such as with a near-field wireless communications device so as to enjoy the performance advantages of both while dramatically reducing the cost and complexity of having two separate systems.

BRIEF SUMMARY

In one aspect, a wireless data-reader communications device includes a near-field antenna-structure, a far-field antenna-structure, a processor, and a memory. The near-field antenna-structure includes a near-field antenna configured to be near-field operable. The far-field antenna-structure includes a far-field antenna configured to be far-field operable. The processor is in communication with the near-field antenna-structure and the far-field antenna-structure. The memory is in communication with the processor. The memory has instructions that cause the processor to interrogate a respective wireless data provider communications device with at least one of the near-field and the far-field antenna-structures.

In another aspect, a method of operating a wireless data-reader communications device that wirelessly reads data from wireless data-provider communications devices includes: selecting an operational mode for the wireless data-reader communications device; interrogating at least one wireless data-provider communications device with a near-field antenna when a near-field operational mode is the selected operational mode; and interrogating at least one wireless data-provider communications device with a far-field antenna when the far-field operational mode is the selected operational mode.

BRIEF DESCRIPTION OF THE SEVERAL VIEWS OF THE DRAWINGS

FIG. 14 is a flow diagram of another exemplary method of selecting an operational mode for a wireless data-provider communications device, according to one non-limiting illustrated embodiment.

FIG. 15 is a flow diagram of another exemplary method of selecting an operational mode for a wireless data-provider communications device, according to one non-limiting illustrated embodiment.

Figure 1:
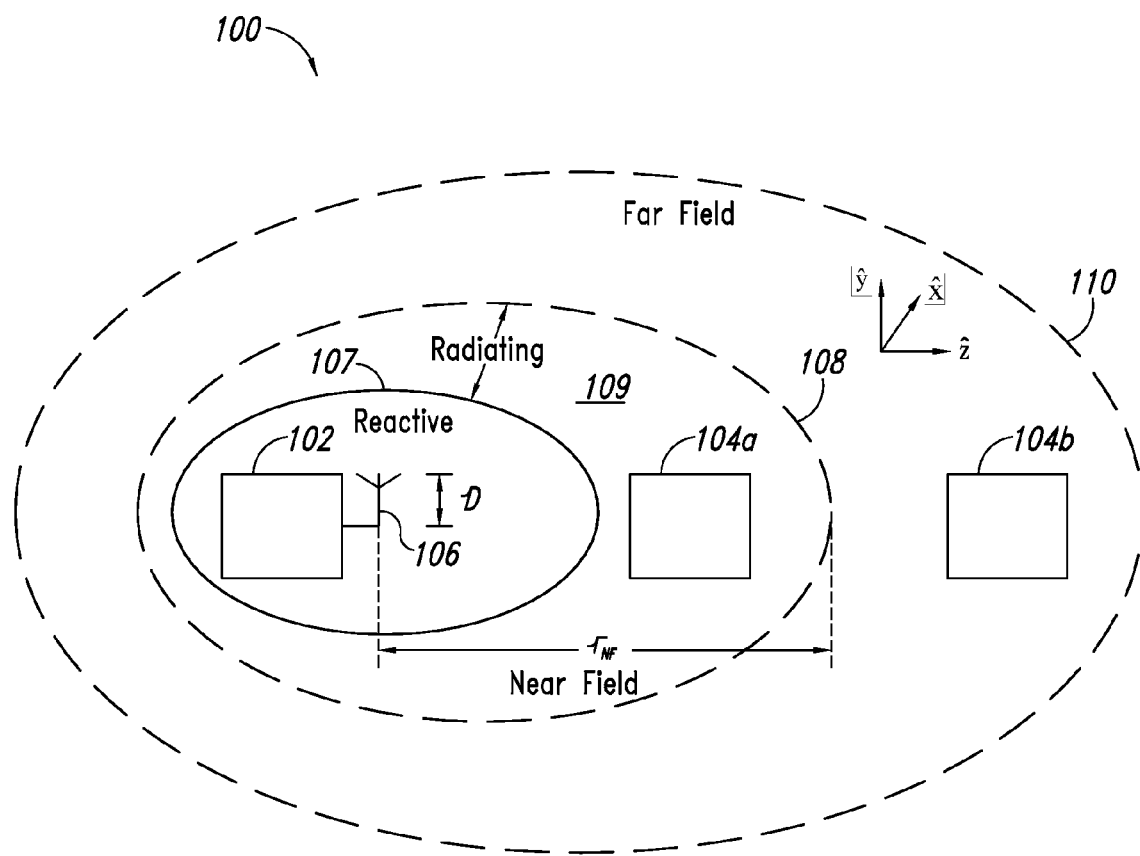
FIG. 1 is a block diagram of an automatic data collection system according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with antennas and/or with automatic data collection devices and/or with wireless data communication devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions. In alternative embodiments, which are within the scope of the disclosure invention, various logical functions, steps, or acts may be executed out of order from that shown or discussed, including substantially concurrently or in reverse order, and/or manually, depending on the functionality involved, as would be understood by those reasonably skilled in the art.

FIG. 1 shows components of an automatic data collection system 100 having multiple wireless data communications devices according to one illustrated embodiment. The multiple wireless communications devices include a wireless communications data-reader device 102 and two wireless communications data-provider devices, which are individually referenced as 104a and 104b and collectively referenced as 104.

The wireless communications data-reader device 102 may be configured to wirelessly interrogate the wireless communications data-provider devices 104. The respective wireless communications data-provider devices 104a, 104b may provide data to the wireless communications data-reader device 102 in response to interrogation by the wireless communications data-reader device 102.

The wireless communications data-reader device 102 includes at least one antenna-assembly 106 that is operable to emit and receive electromagnetic radiation, i.e., an electric field and a magnetic field. Around the wireless communications data-reader device 102 is a near-field region 108 and a far-field region 110.

In the far-field region 110, the angular distribution of the electric field (and the angular distribution of the magnetic field) does not depend upon the distance from the antenna-assembly 106. The electric field and the magnetic field are uniquely related to each other via free-space impedance and decay as $1/r$.

In the near-field region 108, the electric field and magnetic field have different angular radial dependence (e.g., $1/r^3$). The near-field region 108 includes two sub regions: reactive region 107 and radiating region 109, which encompasses the reactive region 107 and which extends between the reactive region 107 and the outer periphery of the near-field region 108. In the radiating region 109, the angular distribution of electric fields and magnetic fields, which are transmitted from the antenna-assembly 106, are dependent on the distance from the antenna-assembly 106. In the reactive region 107, electromagnetic energy is stored but not radiated outwardly from the antenna-assembly 106.

In some embodiments, the antenna-assembly 106 may include at least one antenna that may be shaped and dimensioned to have maximum size D and may be configured to be compatible to specific or particular wavelengths (e.g., wavelengths used in ultra high frequency (UHF), radio frequency identification (RFID)). In that case, the approximate boundary between the far-field region 110 and the near-field region 108 is commonly given as $r=2D^2/\lambda$, where D is the maximum antenna dimension and $\lambda$ is the wavelength.

In some embodiments, the antenna-assembly 106 may be electrically small such as a type of antenna that may be used in low frequency or high frequency (Lf/Hf) radio frequency identification. In that case, the radiating near-field region 109 is small and the boundary between the far-field region 110 and near-field region 108 is commonly given as $r=2\lambda/\pi$.

Further details regarding near-field regions and far-field regions may be found in the following references, all of which are incorporated by reference in their entirety: "Engineering Applications of the Modulated Scatterer Technique," Artech House, 2001, J. C. Bolomey and F. Gardiol; "The World of the Near-field," Evaluation Engineering, October 2005, HTTP://http://www.evaluationengineering.com/archive/articles/1005— 1005the_world.asp, T. Lecklider; "Antenna Theory: Analysis and Design," John Wiley and Sons, 1997, C. A. Balanis; "On Radiating-Zone Boundaries of Short, $\lambda/2$, and $\lambda$ Dipoles," IEEE Antennas and Propagation Magazine, Vol. 46, no. 5, October 2004, pp. 53-64, S. Laybros, P. Combes; "An Overview of Near Field UHF RFID," http://www.ee.washington.edu/faculty/nikitin_pavel/papers/RFID_2007.pdf, P. V. Nikitin, K. V. S. Rao. It should be noted that the reference point of the antenna-assembly 106, also referred to as phase center of antenna, depends on antenna geometry and the electrical size of the antenna-assembly 106.

Two wireless communications data-provider devices 104a and 104b are shown in FIG. 1. The wireless communications data-provider devices 104a and 104b may be essentially identical.

The wireless communications data-provider device 104a is within the near-field region 108 of the wireless communications data-reader device 102, and the wireless communications data-provider device 104b is in the far-field region 110. The wireless communications data-provider devices 104 may be configured to communicate with the wireless communications data-reader device 102 whether the wireless communications data-provider devices 104 are within the near-field region 108 or in the far-field region 110, i.e., outside of the near-field region 108.

Figure 2A:
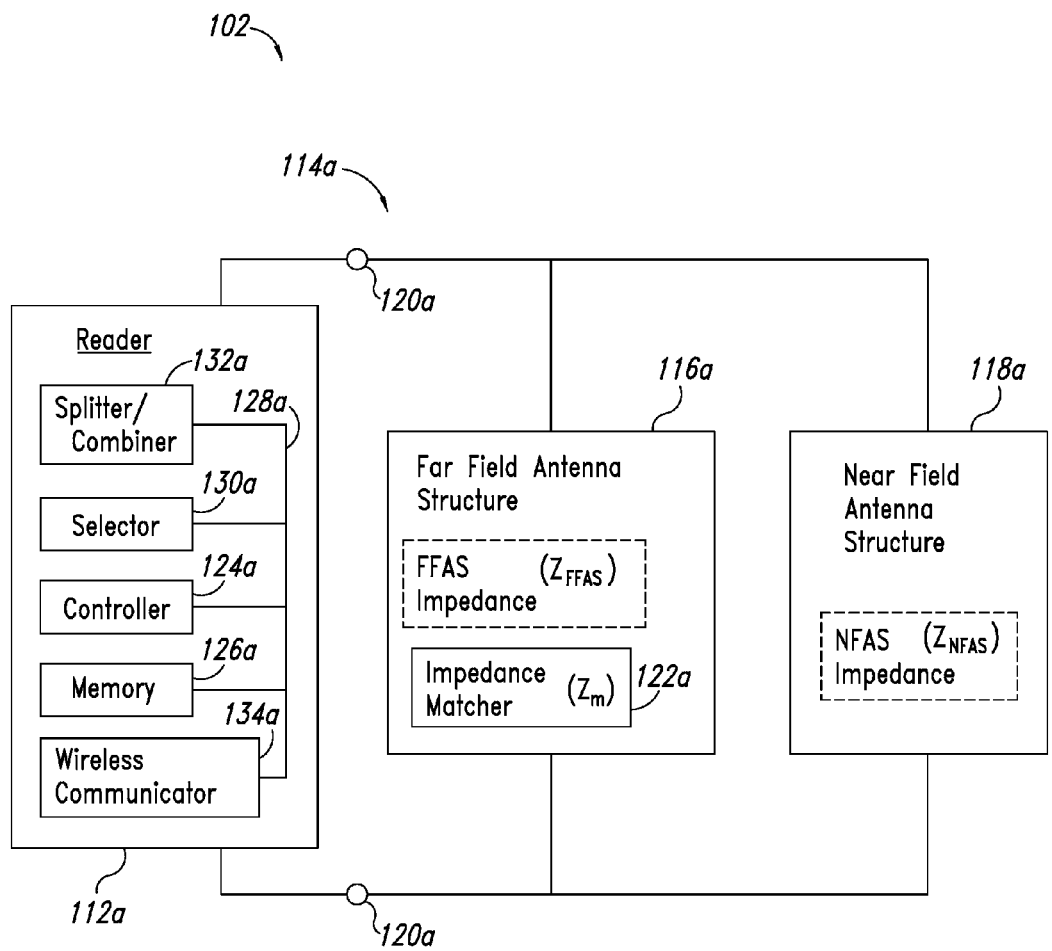
FIG. 2A is a block diagram of a wireless communications data-reader device according to one non-limiting illustrated embodiment.

FIG. 2A shows selected components of the wireless communications data-reader device 102 according to a nonlimiting illustrated embodiment. The wireless communications data-reader device 102 may include a data-reader assembly 112a and a reader antenna-assembly 114a. The reader antenna-assembly 114a may include a far-field antenna-structure 116a and a near-field antenna-structure 118a. The reader antenna-assembly 114a may be electrically coupled to the data-reader assembly 112a at a pair of antenna feedpoints 120a. In the illustrated embodiment of FIG. 2A, the far-field antenna-structure 116a and the near-field antenna-structure 118a are electrically in parallel and share the pair of antenna feedpoints 120a.

Both the far-field antenna-structure 116a and near-field antenna-structure 118a have a respective amount of inherent impedance, which are individually referred to as inherent far-field antenna-structure impedance ($Z_{FFAS}$) and inherent near-field antenna-structure impedance ($Z_{NFAS}$), as measured across the pair of antenna feedpoints 120a when there is no impedance matcher.

In the embodiment illustrated in FIG. 2A, the far-field antenna-structure 116a includes an impedance matcher 122a to reduce unwanted backscatter. The impedance matcher 122a has an impedance ($Z_M$). The impedance matcher 122a may include electrical and network components such as, but not limited to, a resistor, a capacitor, a balun, and an inductor.

Thus, the actual impedance across the near-field antenna-structure 118a may match, within a given amount of tolerance, the actual impedance across the far-field antenna-structure 116a, where the actual impedance across the far-field antenna-structure 116a is a function of the inherent far-field antenna-structure impedance ($Z_{FFAS}$) and the impedance ($Z_M$) of the impedance matcher 122a. Typically, the actual impedance across the near-field antenna-structure 118a and the actual impedance across the far-field antenna-structure 116a may have a relative difference of between 0-50%.

In some embodiments, such as in an RFID reader, the actual impedance of the near-field antenna-structure 118a and the actual impedance across the far-field antenna-structure 116a may be matched to an output port impedance, which may be in the range of 25-75 Ohms. In the case where the output port impedance is approximately 50 Ohm, a good impedance match may be such that the return may be approximately −20 dB or less (VSWR=1.2). This translates into antenna impedance tolerance of ±10 Ohms.

The data-reader assembly 112a may be any device configured to interrogate wireless communications data-provider devices 104 using the reader antenna-assembly 114a. The data-reader assembly 112a may include a controller 124a, a memory 126a, and at least one bus 128a. In some embodiments, the data-reader assembly 112a may include optional components such as a selector 130a, a power splitter/combiner 132a, and a wireless communicator 134a, all of which may be communicatively coupled to the controller 124a by the bus 128a.

The controller 124a may be a device for executing software, particularly that stored in the memory 126a. The controller 124a can be a custom-made or commercially available processor, a central processing unit (CPU), an auxiliary processor among several processors associated with the interface generation system 200, a semiconductor-based microprocessor (in the form of a microchip or chip set), or generally any device for executing software instructions.

The memory 126a is communicatively coupled to the controller 124a. The memory 126a may include any one or a combination of volatile memory elements such as a read-only memory (ROM) and a random-access memory (RAM). The random-access memory (RAM) may include dynamic random-access memory (DRAM), static random-access memory (SRAM), synchronous dynamic random-access memory (SDRAM), flash RAM, etc.

The memory 126a may store one or more logic modules or logic routines, each of which may comprise an ordered listing of executable instructions for implementing logical functions. In particular, the memory 126a may include an operating system (not shown) and data-provider communication logic (not shown), among other logic. The execution of the operating system by the controller 124a essentially controls the execution of other logic, such as data-provider communication logic and provides scheduling, input-output control, file and data management, memory management, and communication control and related services.

The selector 130a may be any device capable of switching the wireless communications data-reader device 102 from a current operational mode to one of a far-field operational mode, a near-field operational mode, and/or a joint operational mode. In some embodiments, the selector may be physically manipulated by a user and may include components such as a switch, a toggle, a lever, etc. In some embodiments, the selector 130a may be controllable by the controller 124a, and may switch the wireless communications data-reader device 102 to far-field operational mode, near-field operational mode, and/or joint operational mode, responsive to one or more signals from the controller 124a.

In far-field operational mode, the wireless communications data-reader device 102 employs the far-field antenna-structure 116a to interrogate wireless communications data-provider devices 104.

In near-field operational mode, the wireless communications data-reader device 102 employs the near-field antenna-structure 118a to interrogate wireless communications data-provider devices 104.

In joint operational mode, the wireless communications data-reader device 102 employs the near-field antenna-structure 118a to interrogate wireless communications data-provider devices 104 that are within the near-field region 108 and employs the far-field antenna-structure 116a to interrogate wireless communications data-provider devices 104 that are within the far-field region 110 and outside of the near-field region 108.

The power splitter/combiner 132a may be configured to split a signal from the controller 124a and/or other components of the data-reader assembly 112a and provide respective portions of the signal to either or both the far-field antenna-structure 116a and the near-field antenna-structure 118a. The power splitter/combiner 132a may also be configured to receive signals from either or both the far-field antenna-structure 116a and the near-field antenna 118a including separate signals from either or both the far-field antenna-structure 116a and the near-field antenna 118a and provide the respective signals to the controller 124a and/or other components of the data-reader assembly 112a.

The wireless communicator 134a may be any device that provides wireless communications such as a Wi-Fi compatible device, a Bluetooth compatible device, etc. The wireless communicator 134a may typically communicate with a remote device using an antenna that is separate from the far-field antenna-structure 116a and/or the near-field antenna-structure 118a. The wireless communicator 134a may receive a reader-mode command message, which may include a mode-indicator indicative of an operational mode. Based at least partially on the reader-mode command message, the controller 124a may cause the selector 130a to switch the wireless communications data-reader device 102 between far-field operational mode, near-field operational mode, and/or joint operational mode.

Figure 2B:
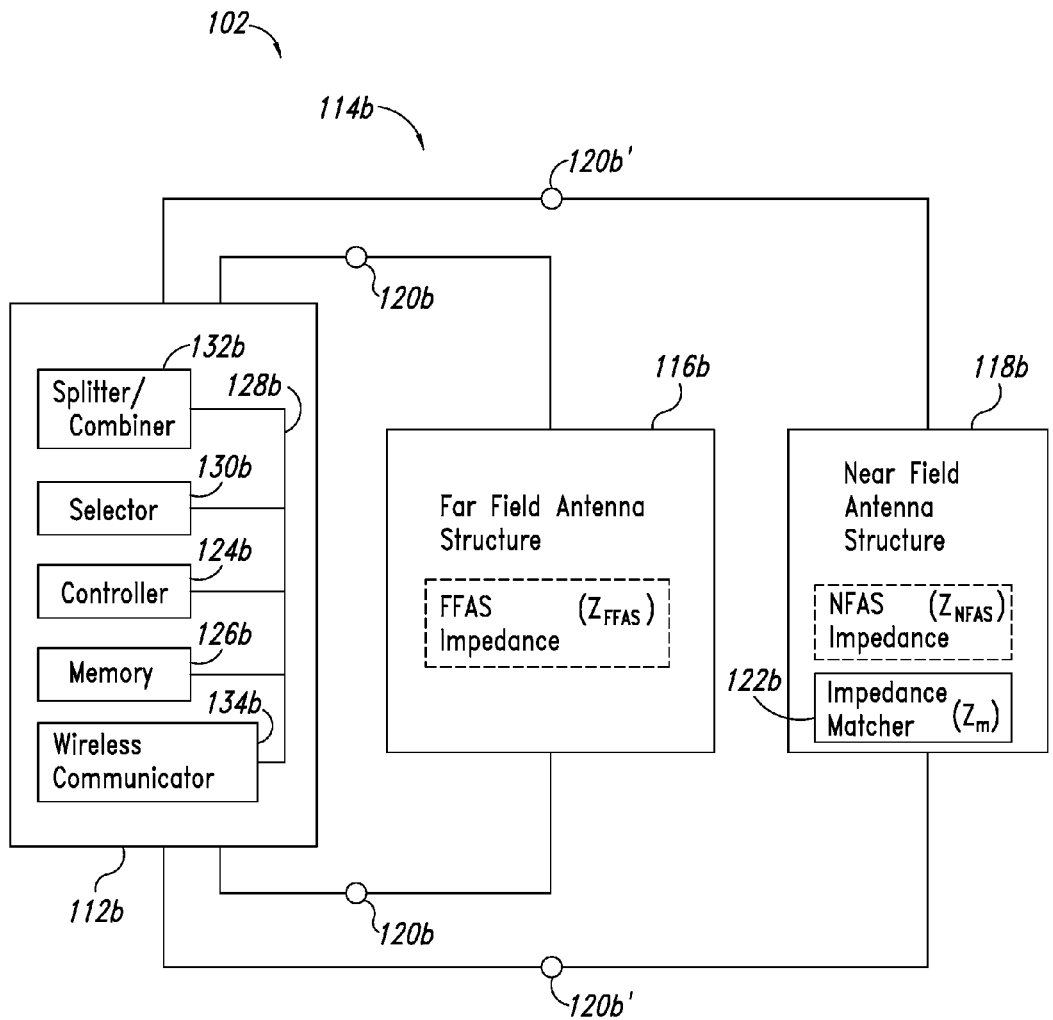
FIG. 2B is a block diagram of another wireless communications data-reader device according to one non-limiting illustrated embodiment.

FIG. 2B shows selected components of the wireless communications data-reader device 102 according to another nonlimiting illustrated embodiment. In the description of FIG. 2B, various labels having a respective reference numeral with the letter "b" concatenated thereto identify components and/or features that are similar in at least some respects to those of FIG. 2A that are labeled with the same respective reference numeral and have the letter "a" concatenated thereto. The detailed description of such components are initially provided with respect to the embodiment of FIG. 2A and, for the sake of brevity, the description of such components in the context of their subsequently labeled counterparts is abbreviated or omitted.

The wireless communications data-reader device 102 may include a data-reader assembly 112b and a reader antenna-assembly 114b. The reader antenna-assembly 114a may include a far-field antenna-structure 116b and a near-field antenna-structure 118b. The far-field antenna-structure 116b may be electrically coupled to the data-reader assembly 112b at a first pair of antenna feedpoints 120b. The near-field antenna-structure 118b may be electrically coupled to the data-reader assembly 112b at a second pair of antenna feedpoints 120b'.

It should be noted that in some embodiments, each of the far-field antenna-structure 116b and the near-field antenna-structure 118b may be coupled to the data-reader assembly 112b via a respective non-shared antenna feedpoint and a shared antenna feedpoint. For example, the shared antenna feedpoint may be electrically grounded.

In this non-limiting embodiment, the impedance matcher 122b is illustrated as being included with the near-field antenna-structure 118b.

Figure 3A:
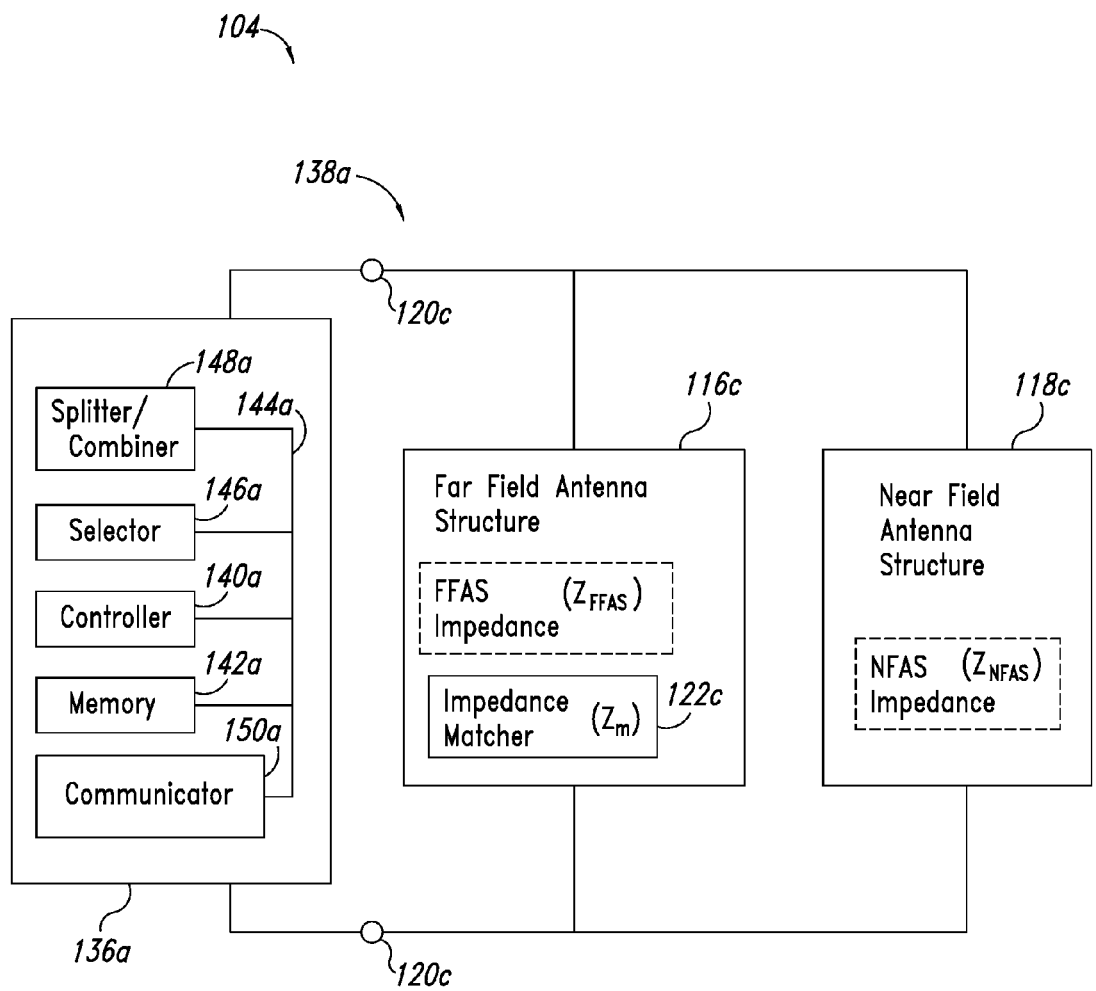
FIG. 3A is a block diagram of a wireless communications data-provider device according to one non-limiting illustrated embodiment.

FIG. 3A shows selected components of the wireless communications data-provider device 104 according to a nonlimiting illustrated embodiment. In the description of FIG. 3A, various labels having a respective reference numeral with the letter "c" concatenated thereto identify components and/or features that are similar in at least some respects to those of FIG. 2A that are labeled with the same respective reference numeral and have the letter "a" concatenated thereto. The detailed description of such components are initially provided with respect to the embodiment of FIG. 2A and, for the sake of brevity, the description of such components in the context of their subsequently labeled counterparts is abbreviated or omitted.

The wireless communications data-provider device 104 may include a data-provider assembly 136a and a data-provider antenna-assembly 138a. The data-provider antenna-assembly 138a may include a far-field antenna-structure 116c and a near-field antenna-structure 118c. The data-provider antenna-assembly 138a may be electrically coupled to the data-provider assembly 136a at a pair of antenna feedpoints 120c. In the illustrated embodiment of FIG. 2A, the far-field antenna-structure 116c and the near-field antenna-structure 118c are electrically in parallel and share the pair of antenna feedpoints 120c.

In the embodiment illustrated in FIG. 3A, the far-field antenna-structure 116c includes an impedance matcher 122c to reduce unwanted backscatter. The impedance matcher 122c has an impedance ($Z_M$) such that the actual impedance across the near-field antenna-structure 118c may match, within a given amount of tolerance, the actual impedance across the far-field antenna-structure 116c, where the actual impedance across the far-field antenna-structure 116c is a function of the inherent far-field antenna-structure impedance ($Z_{FFAS}$) and the impedance ($Z_M$) of the impedance matcher 122c.

The data-provider assembly 136a may be any device configured to respond to interrogation by wireless communications data-reader device 102 using the data-provider antenna-assembly 138a. In some embodiments, the data-provider assembly 136a may include components of devices such as, but not limited to, radio frequency identification (RFID) devices.

The data-provider assembly 136a may include a controller 140a, a memory 142a, and at least one bus 144a. In some embodiments, the data-provider assembly 136a may include optional components such as a selector 146a, a power splitter/combiner 148a, and a communicator 150a such as a wireless transceiver or wireless transponder, all of which may be communicatively coupled to the controller 140a by the bus 144a.

The controller 140a may be a hardware device for executing software, particularly that stored in the memory 142a. The controller 140a can be a custom-made or commercially available processor, a central processing unit (CPU), a semiconductor-based microprocessor (in the form of a microchip or chip set), or generally any device for executing software instructions.

The memory 142a is communicatively coupled to the controller 140a. The memory 142a may include any one or combination of volatile memory elements such as a read-only memory (ROM) and a random-access memory (RAM). The random-access memory (RAM) may include dynamic random-access memory (DRAM), static random-access memory (SRAM), synchronous dynamic random-access memory (SDRAM), flash RAM, etc.

The memory 142a may store data and one or more logic modules or logic routines, each of which may comprise an ordered listing of executable instructions for implementing logical functions. In particular, the memory 142a may include an operating system (not shown) and data-provider communication logic (not shown), among other logic. The execution of the operating system by the controller 140a essentially controls the execution of other logic, such as data-provider communication logic and provides scheduling, input-output control, file and data management, memory management, and communication control and related services.

The selector 146a may be any device capable of switching the wireless communications data-provider device 104 from a current operational mode to one of a far-field operational mode, a near-field operational mode, and/or a joint operational mode. In some embodiments, the selector 146a may be physically manipulated by a user and may include components such as a switch, a toggle, a lever, etc. In some embodiments, the selector 146a may be configured to electrically decouple/couple a respective one of the antenna structures and electrically couple/decouple the other one of the antenna structures.

In some embodiments, wireless communications data-provider device 104 may be set an operational mode, and the wireless communications data-provider device 104 may be configured such that the wireless communications data-provider device 104 will operate only the set operational mode until the current/set operational mode is reset to a different operational mode by the selector 146a.

In some embodiments, the selector 146a may be controllable by the controller 140a, and may switch the wireless communications data-provider device 104 from a current operational mode to one of a far-field operational mode, a near-field operational mode, and/or a joint operational mode, responsive to one or more signals from the controller 140a.

The wireless communications data-provider device 104 may be a passive device configured to be powered by electromagnetic energy received at one or both of the far-field antenna-structure 116c and the far-field antenna-structure 116c.

In far-field operational mode, the wireless communications data-provider device 104 employs the far-field antenna-structure 116c to respond to interrogation from the wireless communications data-reader device 102.

In near-field operational mode, the wireless communications data-provider device 104 employs the far-field antenna-structure 116c to respond to interrogation from the wireless communications data-reader device 102.

In some embodiments, in joint operational mode, the wireless communications data-provider device 104 may use one of the antennas to receive electromagnetic energy and use the other antenna to respond to interrogation by the wireless communications data-reader device 102. For example, when the wireless communications data-provider device 104 is within a respective near-field region 108 of a first wireless communications data-reader device 102 and within a respective far-field region 110 of a second wireless communications data-reader device 102 (or a wireless power emitter), the wireless communications data-provider device 104 may employ the near-field antenna-structure 118c to respond to interrogation from the first wireless communications data-reader device 102 and may employ the far-field antenna-structure 116c to energize at least one circuit of the wireless communications data-provider device 104.

In some embodiments, the wireless communications data-provider device 104 may be set in joint operational mode so that the wireless communications data-provider device 104 may employ the appropriate antenna structure (near-field antenna-structure 118c or the far-field antenna-structure 116c) to respond to interrogation by the wireless communications data-reader device 102 depending upon the distance between the wireless communications data-reader device 102 and the wireless communications data-provider device 104.

The power splitter/combiner 148a may be configured to split a signal from the controller 140a and/or other components of the data-provider assembly 136a and provide respective portions of the signal to either or both the far-field antenna-structure 116c and the near-field antenna-structure 118c. The power splitter/combiner 148a may also be configured to receive signals from either or both the far-field antenna-structure 116c and the near-field antenna 118c, including separate signals from either or both the far-field antenna-structure 116c and the near-field antenna 118c and provide the respective signals to the controller 140a and/or other components of the data-provider assembly 136a.

The communicator 150a may be any device that provides wireless communications in response to interrogation by the wireless communications data-reader device 102. For example, the communicator 150a may be a wireless transponder or a wireless transceiver. The communicator 150a may typically communicate with the wireless communications data-reader device 102 using either the far-field antenna-structure 116c and/or the near-field antenna-structure 118c. The communicator 150a may receive a provider-mode command message, which may include a mode indicator indicative of an operational mode. Based at least partially on the provider-mode command message, the controller 140a may cause the selector 146a to switch the wireless communications data-provider device 104 from a current operational mode to one of a far-field operational mode, a near-field operational mode, and/or a joint operational mode. Among other things, the communicator 150a may provide data from the memory 142a in response to interrogation by the wireless communications data-reader device 102.

In some embodiments, the data-provider assembly 136a may be at least partially powered by electromagnetic energy received by the data-provider antenna-assembly 138a.

In some embodiments, the communicator 150a and/or the controller 140a may be configured to selectively vary an impedance of the data-provider antenna-assembly 138a and/or selectively vary an impedance of the data-provider assembly 136a. The communicator 150a and/or the controller 140a may selectively vary an impedance so as to controllably backscatter electromagnetic energy received by the data-provider antenna-assembly 138a.

Figure 3B:
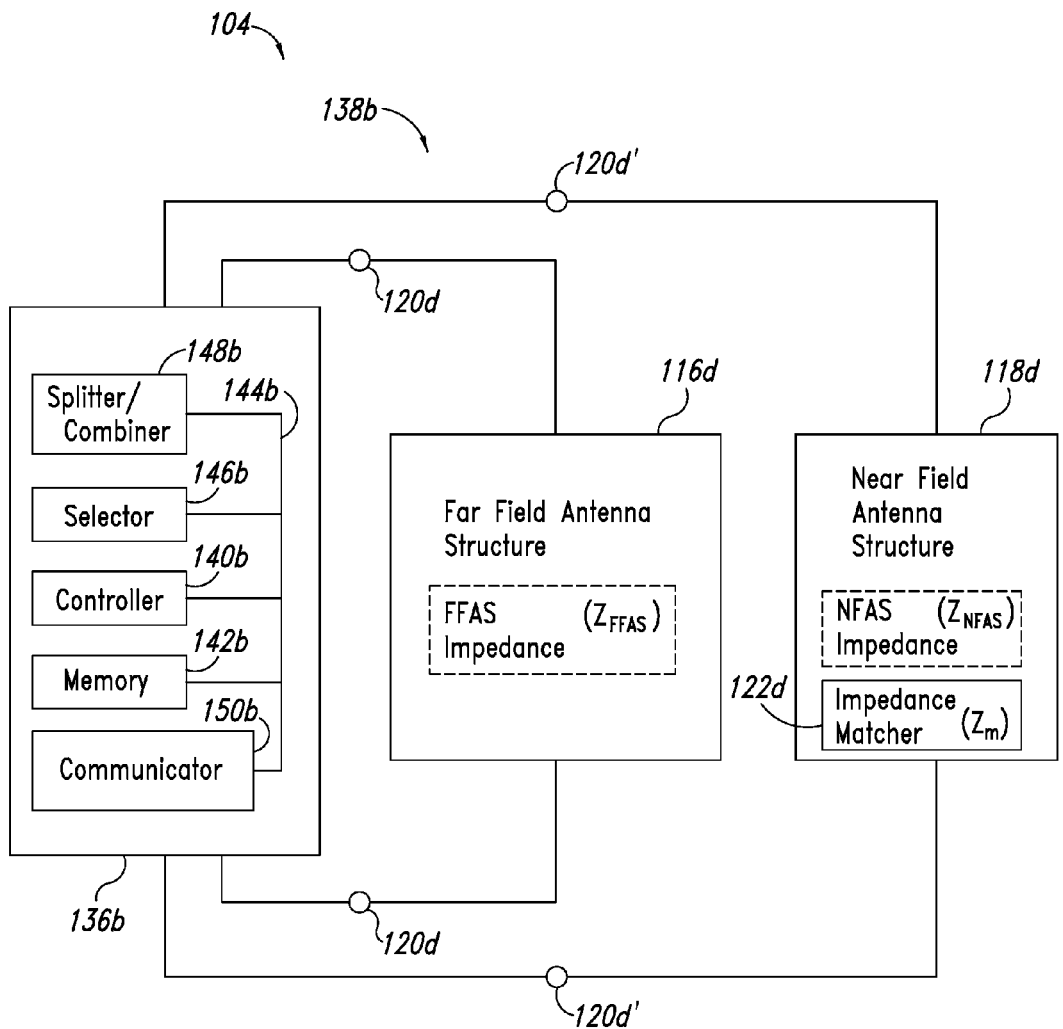
FIG. 3B is a block diagram of another wireless communications data-provider device according to one non-limiting illustrated embodiment.

FIG. 3B shows selected components of the wireless communications data-provider device 104 according to another nonlimiting illustrated embodiment. In the description of FIG. 3B, various labels having a respective reference numeral with the letter "b" concatenated thereto identify components and/or features that are similar in at least some respects to those of FIG. 3A that are labeled with the same respective reference numeral and have the letter "a" concatenated thereto. The detailed description of such components are initially provided with respect to the embodiment of FIG. 3A and, for the sake of brevity, the description of such components in the context of their subsequently labeled counterparts is abbreviated or omitted.

In addition, various labels having a respective reference numeral with the letter "d" concatenated thereto identify components and/or features that are similar in at least some respects to those of FIG. 2A that are labeled with the same respective reference numeral and have the letter "a" concatenated thereto. The detailed description of such components are initially provided with respect to the embodiment of FIG. 2A and, for the sake of brevity, the description of such components in the context of their subsequently labeled counterparts is abbreviated or omitted.

The wireless communications data-provider device 104 may include a data-provider assembly 136b and a data-provider antenna-assembly 138b. The data-provider antenna-assembly 138b may include a far-field antenna-structure 116d and a near-field antenna-structure 118d. The far-field antenna-structure 116d may be electrically coupled to the data-provider assembly 136b at a first antenna feedpoint 120d. The near-field antenna-structure 118d may be electrically coupled to the data-provider assembly 136b at a second antenna feedpoint 120d'. Both the far-field antenna-structure 116d and the near-field antenna-structure 118d may be electrically coupled to the data-provider assembly 136b at a third antenna feedpoint 120d".

In this non-limiting embodiment, the impedance matcher 122d is illustrated as being included with the near-field antenna-structure 118d.

FIGS. 4A-4C and 5-7 show various non-limiting embodiments of an antenna-assembly. The various embodiments of the antenna-assembly shown in FIGS. 4A-4C and 5-7 may include features and/or components similar in at least some respects to features and/or components previously described, such as the reader antenna-assembly 114a, 114b, and/or the data-provider antenna-assemblies 138a, 138b. Thus, in FIGS. 4A-4C and 5-7 various labels having a respective reference numeral without a respective letter of the English alphabet concatenated thereto identify components and/or features that are similar in at least some respects to those of FIGS. 2A, 2B and FIGS. 3A, 3B having the same respective reference numeral with a respective letter of the English alphabet concatenated thereto. The detailed description of such components are initially provided with respect to the embodiments of FIGS. 2A, 2B and/or FIGS. 3A, 3B and, for the sake of brevity, the description of such components in the context of their subsequently labeled counterparts is abbreviated or omitted.

Figure 4A:
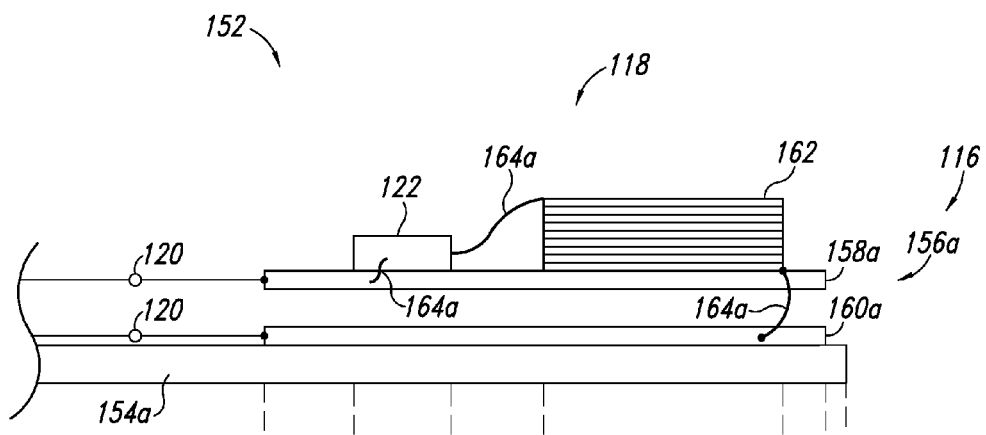
FIG. 4A and FIG. 4B are a side view and top view, respectively, of an antenna-assembly according to one non-limiting illustrated embodiment.
Figure 4B:
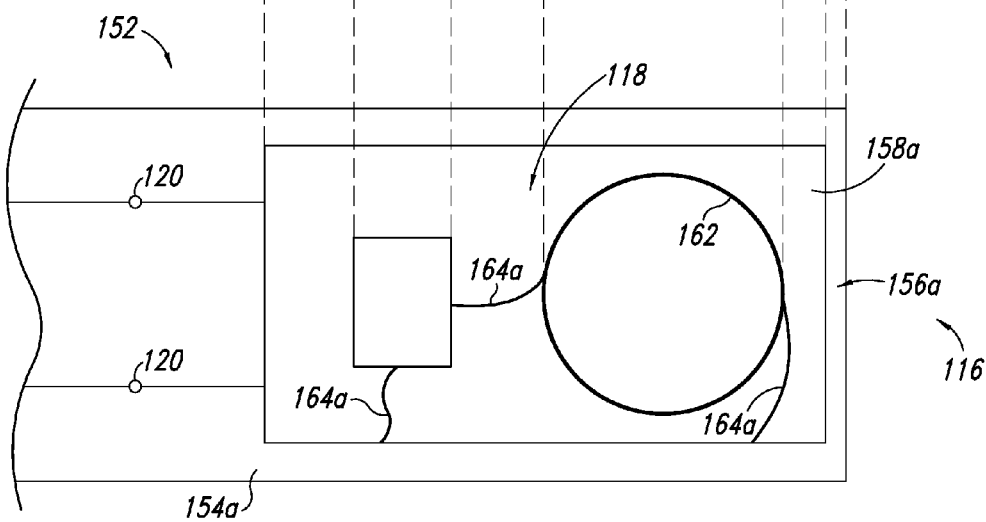

FIGS. 4A and 4B show a side view and a top view, respectively, of an antenna-assembly 152 according to one illustrated embodiment. The antenna-assembly 152 includes a far-field antenna-structure 116, a near-field antenna structure 118, and an antenna carrier 154a. The antenna carrier 154a may be any substrate suitable for carrying the far-field antenna-structure 116 and the near-field antenna-structure 118. In the illustrated embodiment, the far-field antenna-structure 116 includes a patch antenna 156a having an upper plate 158a and a lower plate 160a. The upper plate 158a carries the near-field antenna-structure 118, which includes a coil antenna 162 and an impedance matcher 122.

Various components of the antenna-assembly 152 are electrically coupled by conductive members 164a. The impedance matcher 122 is electrically coupled to the upper plate 158a via a first one of the conductive members 164a. A second one of the conductive members 164a electrically couples the impedance matcher 122 to the coil antenna 162, which is electrically coupled to the lower plate 160a by a third one of the conductive members 164a. The upper plate 158a and the lower plate 160a are each electrically conductive and electrically coupled to a respective antenna feedpoint 120.

It should be noted that in some embodiments, the impedance matcher 122 may be carried directly by the antenna carrier 154a and electrically coupled to at least one of the antenna feed 120, coil antenna 162 of the near-field antenna-structure 118, or the patch antenna 156a of the far-field antenna-structure 116. In other embodiments, the impedance matcher 122 may be carried by a component or substrate that is different from the antenna carrier 154a such as, but not limited to, the data-reader assembly or the data-provider assembly.

Xxx

Figure 4C:
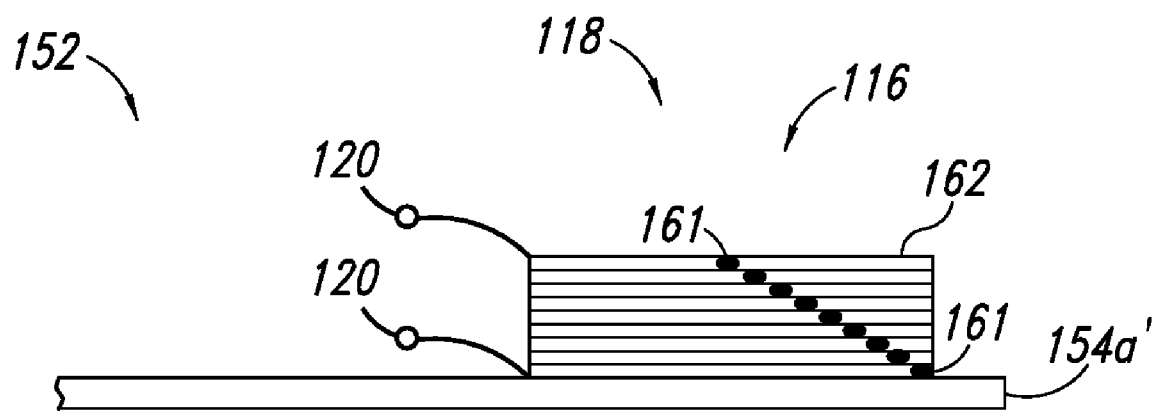
FIG. 4C is a top view of another antenna-assembly according to one non-limiting illustrated embodiment.

FIG. 4C shows a side view of an antenna-assembly 152 according to one illustrated embodiment. The antenna-assembly 152 includes a far-field antenna-structure 116, a near-field antenna structure 118, and an antenna carrier 154a'. The antenna carrier 154a' may be any electrically conductive substrate suitable for carrying the far-field antenna-structure 116 and the near-field antenna-structure 118. In the illustrated embodiment, the far-field antenna-structure 116 and the near-field antenna-structure 118 include a coil antenna 162 and the antenna carrier 154a' is electrically conductive to act as a reflector element. The coil antenna 162 is illustrated as a multi-turn coil, but in some embodiments, the coil antenna 162 may be a single turn coil. The coil antenna 162 includes a number of matching elements 161, which may be stubs, capacitors, inductors, etc. In some embodiments, there may be one or more matching elements per turn of the coil antenna 162. The coil antenna 162 may be optimized so that the coil antenna 162 may perform as both near field antenna (generating a strong magnetic field on the axis) and far field antenna (generating a high boresight gain). The optimization may be based on one or more of the following: number of turns, spacing between the turns, height of coil, diameter of coil, additional matching elements 161 included into each turn, placing the coil above the reflector (antenna carrier 154a').

Figure 5:
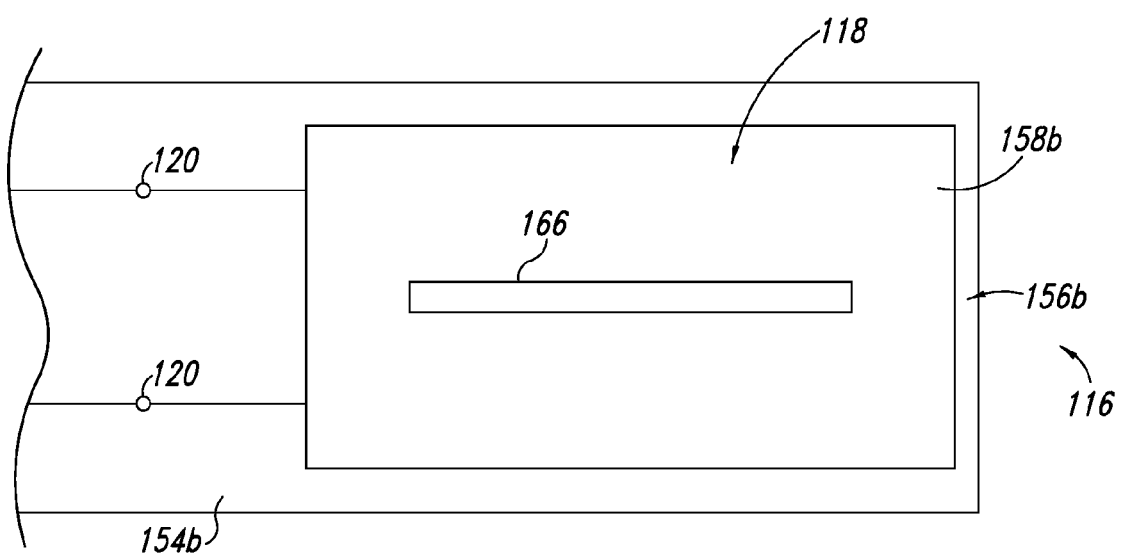
FIG. 5 is a top view of another antenna-assembly according to one non-limiting illustrated embodiment.

FIG. 5 shows a top view of selected components of an antenna-assembly 152 according to another illustrated embodiment. In the description of FIG. 5, various labels having a respective reference numeral with the letter "b" concatenated thereto identify components and/or features that are similar in at least some respects as those of FIGS. 4A and 4B that are labeled with the same respective reference numeral and have the letter "a" concatenated thereto. The detailed description of such components are initially provided with respect to the embodiment of FIGS. 4A and 4B and, for the sake of brevity, the description of such components in the context of their subsequently labeled counterparts is abbreviated or omitted.

The far-field antenna-structure 116 includes a patch antenna 156b. The near-field antenna-structure 118 includes a slot antenna 166, which is formed in the upper plate 158b. The far-field antenna-structure impedance and the near-field antenna-structure impedance are a function of, among other things, materials used in the patch antenna 156b, the size and shape of the patch antenna 156b, and the size and shape of the slot antenna 166. The far-field antenna-structure 116 and the near-field antenna-structure 118 may be constructed to have approximately matching impedance values such that the antenna-assembly 152 might not include an impedance matcher.

Figure 6:
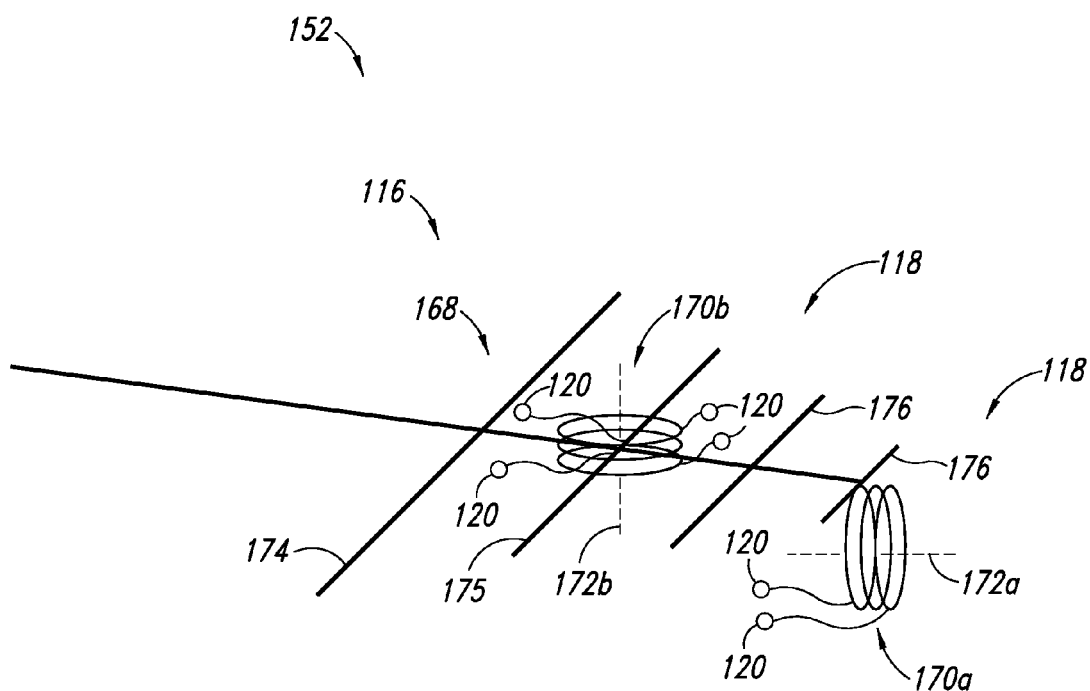
FIG. 6 is an isometric of another antenna-assembly according to one non-limiting illustrated embodiment.

FIG. 6 shows an isometric view of another embodiment of the antenna-assembly 152 according to yet another illustrated embodiment. The antenna-assembly 152 includes the far-field antenna-structure 116 and the near-field antenna-structure 118. The far-field antenna-structure 116 includes a far-field antenna 168. The near-field antenna-structure 118 may include two near-field antennas, individually referenced as near-field antenna 170a, 170b, and collectively referenced as near-field antennas 170.

In the illustrated embodiment, the far-field antenna 168 includes a reflector element 174, a dipole antenna 175 and director elements 176. The far-field antenna may be a directional antenna such as a log-periodic antenna or a Yagi antenna.

In the illustrated embodiment, the near-field antennas 170 may be coils. The dashed line 172a represents a central axis of the near-field antenna 170a, and the dashed line 172b represents a central axis of the near-field antenna 170b. The near-field antenna 170a and the near-field antenna 170b may be mutually aligned such that their respective central axes are approximately perpendicular.

The near-field antenna 170a may be electrically coupled to a first pair of antenna feedpoints 120, and the near-field antenna 170b may be electrically coupled to a second pair of antenna feedpoints 120. Similarly, the dipole antenna 175 may be coupled to a third pair of antenna feedpoints 120. In some embodiments, the near-field antenna 170a, the near-field antenna 170b, and the dipole antenna 175 may be electrically in parallel to each other. In some embodiments, two of the near-field antenna 170a, the near-field antenna 170b, and the dipole antenna 175 may be electrically serially coupled, and the remaining one of the near-field antenna 170a, the near-field antenna 170b, and the dipole antenna 175 may be electrically parallel to the two electrically serially coupled elements. For example, the near-field antenna 170a and the near-field antenna 170b may be electrically serially coupled, and the dipole antenna 175 may be electrically parallel to the serially coupled near-field antenna 170a and near-field antenna 170b. In yet other embodiments, the near-field antenna 170a, the near-field antenna 170b, and the dipole antenna 175 may be electrically serially coupled. Thus, in various embodiments, the antenna-assembly 152 may include three or less pairs of antenna feedpoints 120 to provide and receive signals.

Figure 7:
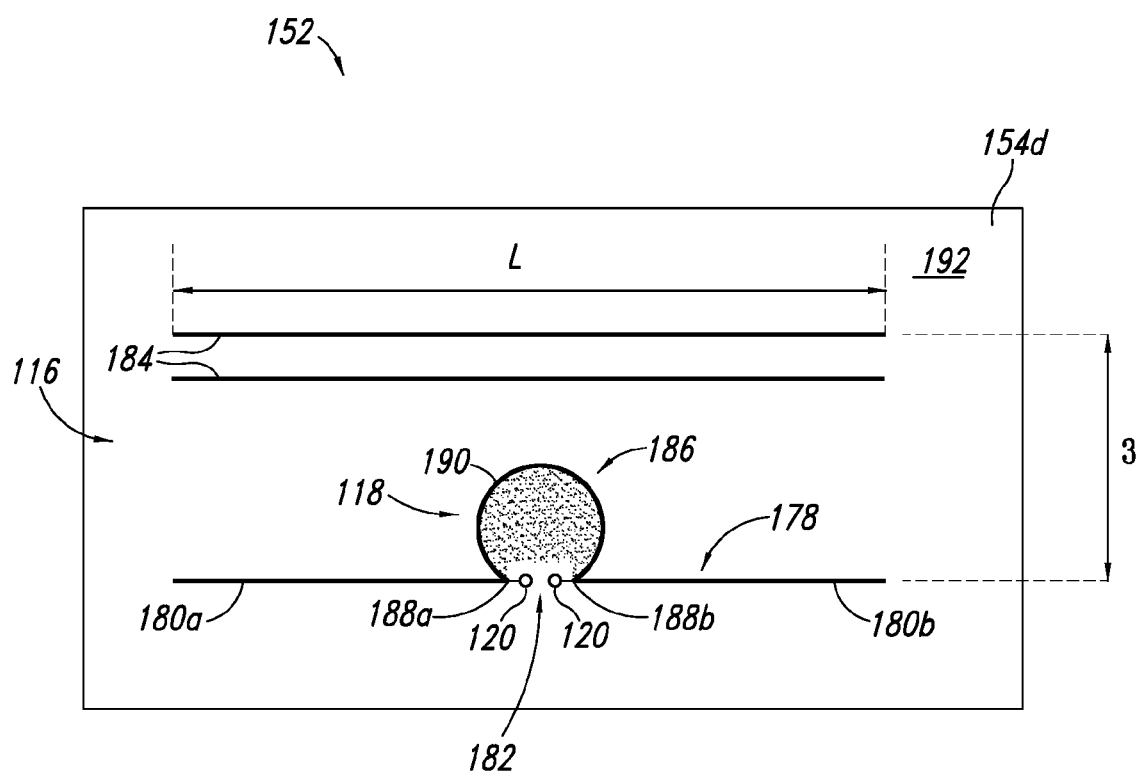
FIG. 7 is a top view of another antenna-assembly according to one non-limiting illustrated embodiment.

FIG. 7 shows a top view of selected components of an antenna-assembly 152 according to yet another illustrated embodiment. In the description of FIG. 7, various labels having a respective reference numeral with the letter "d" concatenated thereto identify components and/or features that are similar in at least some respects to those of FIGS. 4A and 4B that are labeled with the same respective reference numeral and have the letter "a" concatenated thereto. The detailed description of such components are initially provided with respect to the embodiment of FIGS. 4A and 4B and, for the sake of brevity, the description of such components in the context of their subsequently labeled counterparts is abbreviated or omitted.

The far-field antenna-structure 116 may include a Yagi antenna or the like. The far-field antenna-structure 116 may include a dipole antenna 178 having antenna arms 180a and 180b. The antenna arms 180a, 180b are generally linearly aligned on opposed sides of a central region 182. The far-field antenna-structure 116 also includes one or more director elements 184. The director elements 184 may be offset from each other and may be offset from the dipole antenna 178. Typically, the director elements 184 may be generally aligned parallel with the antenna arms, 180a, 180b.

The near-field antenna-structure 118 includes an open loop 186 at the central region 182 of the dipole antenna 178. The open loop 186 includes end portions 188a, 188b, which may be electrically coupled to antenna arms 180a, 180b, respectively. The end portions 188a, 188b are electrically coupled together by a partial loop 190. The partial loop 190 may be shaped to have a curvature that is approximately circular. The open loop 186 electrically couples the respective antenna arms 180a, 180b together.

Electrically coupled to the end portions 188a, 188b are a pair of antenna feedpoints 120. Signals may be provided to the antenna-assembly 152 and received from the antenna-assembly 152 via the antenna feedpoints 120. In this non-limiting embodiment, the far-field antenna-structure 116 and the near-field antenna-structure 118 share the same pair of antenna feedpoints 120.

In some embodiments, far-field antenna-structure 116 and the near-field antenna-structure 118 may be shaped, sized, and configured to have approximately the same amount of inherent impedance. In that case, the antenna-assembly 152 might not employ an impedance matcher.

In some embodiments, each one of the dipole antenna 178 and the director elements 184 may have a respective length, L, of approximately 140 millimeters (mm), and the director elements 184 may be offset from the dipole antenna 178 by a width, W, that is approximately 55 mm.

The antenna carrier 154d carries the far-field antenna-structure 116 and the near-field antenna-structure 118. In some embodiments, the far-field antenna-structure 116 and the near-field antenna-structure 118 may be printed on the antenna carrier 154d. In some embodiments, the antenna carrier 154d may be a substrate having a generally planar surface 192 with the far-field antenna-structure 116 and the near-field antenna-structure 118 disposed and/or printed on the generally planar surface 192. In the embodiment illustrated in FIG. 7, the open loop 186, the dipole antenna 178, and the director elements 184 may be aligned and positioned to be generally planar.

Figure 8:
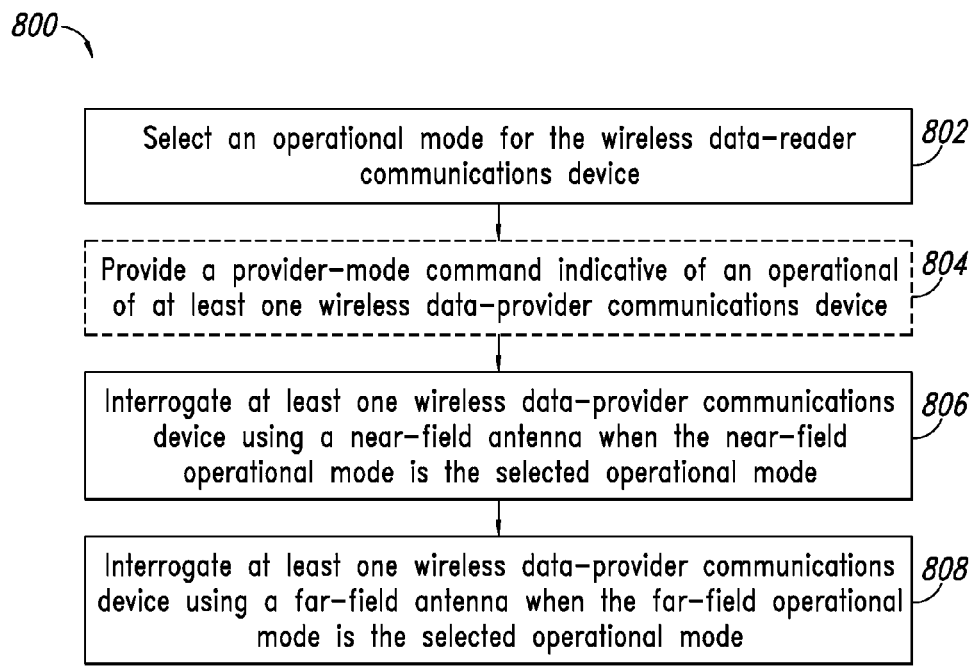
FIG. 8 is a flow diagram of an exemplary method of operating a wireless data-reader communications device that wirelessly reads data from wireless data-provider communications devices, according to one non-limiting illustrated embodiment.

FIG. 8 shows a method 800 of operating a wireless data-reader communications device that wirelessly reads data from wireless data-provider communications devices, according to one illustrated embodiment. Certain acts in the processes or process flow described in all of the logic flow diagrams referred to below must naturally precede others to function as described. However, the various embodiments are not limited to the order of the acts described if such order or sequence does not alter the functionality of one or more of the embodiments. That is, it is recognized that some acts may be performed before, after, or in parallel with other acts. Further, some embodiments, may include additional acts and/or omit other acts.

At 802, an operational mode may be selected for the wireless data-reader communications device.

At 804, which may be optional, a provider-mode command may be provided to at least one wireless data-provider communications device. The provider-mode command may be indicative of a particular operational mode that the wireless data-provider communications device should employ. For example, the provider-mode command may be indicative of near-field operational mode, far-field operational mode, and/or joint operational mode.

At 806, when the near-field operational mode is the selected operational mode, the wireless data-reader communications device may employ a near-field antenna to interrogate at least one wireless data-provider communications device.

At 808, when the far-field operational mode is the selected operational mode, the wireless data-reader communications device may employ a far-field antenna to interrogate at least one wireless data-provider communications device.

Figure 9:
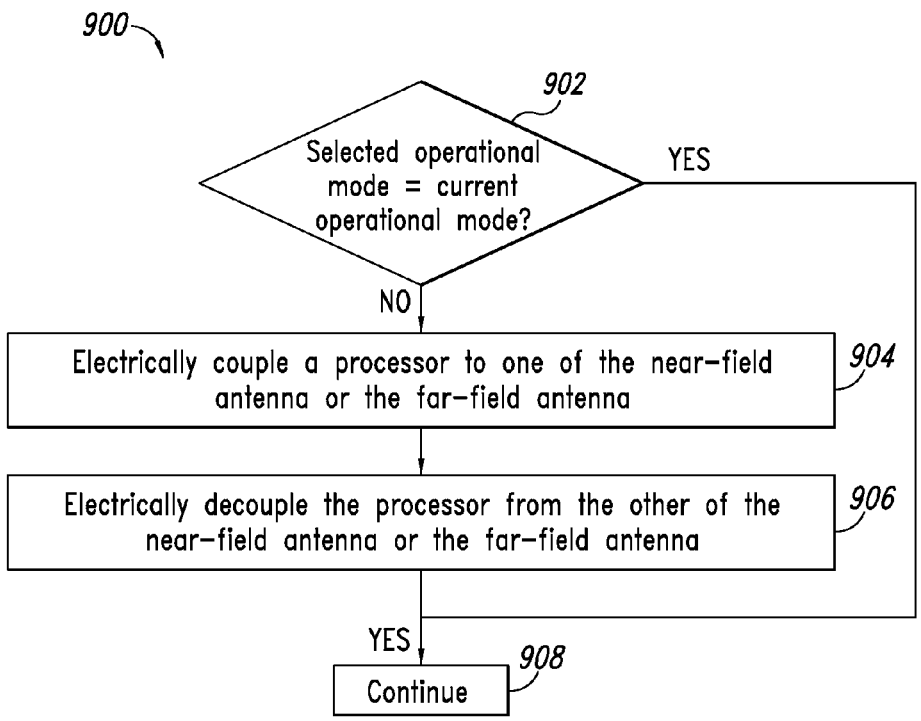
FIG. 9 is a flow diagram of an exemplary method of selecting an operational mode for a wireless data-reader communications device, according to one non-limiting illustrated embodiment.

FIG. 9 shows a method 900 of that may be implemented at block 802 in selection of an operational mode, according to one illustrated embodiment.

At 902, the wireless data-reader communications device determines whether the selected operational mode is the same as a current operational mode of the wireless data-reader communications device. If the selected operational mode is the same as the current operational mode, then the method continues at block 908, otherwise, the method continues at block 904.

If the current operational mode is near-field operational mode, then the wireless data-reader communications device currently employs the near-field antenna. However, if the current operational mode is far-field operational mode, then the wireless data-reader communications device currently employs the far-field antenna. Thus, when the current operational mode is different from the selected operational mode, the wireless data-reader communications device is reconfigured to employ the appropriate antenna.

At 904, a processor is electrically coupled to a selected one of the near-field antenna or the far-field antenna. The selected one of the near-field antenna or the far-field antenna corresponds to the selected operational mode.

At 904, the processor is electrically decoupled from the other one of the near-field antenna or the far-field antenna. For example, if the selected operational mode is far-field operational mode, then the near-field antenna is decoupled from the processor.

At 906, the method continues. The method may continue at optional block 804 or at block 806.

Figure 10:
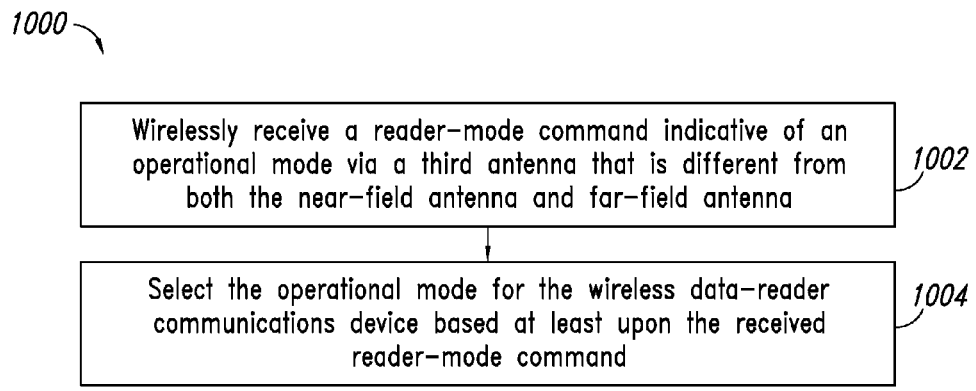
FIG. 10 is a flow diagram of another exemplary method of selecting an operational mode for a wireless data-reader communications device, according to one non-limiting illustrated embodiment

FIG. 10 shows a method 1000 of that may be implemented at block 802 in selection of an operational mode, according to another illustrated embodiment.

At 1002, a reader-mode command indicative of an operational mode is wirelessly received at the wireless data-reader communications device via an antenna that is different from both the near-field antenna and the far-field antenna.

At 1004, the wireless data-reader communications device selects the operational mode for the wireless data-reader communications device based at least partially on the received reader-mode command.

Figure 11:
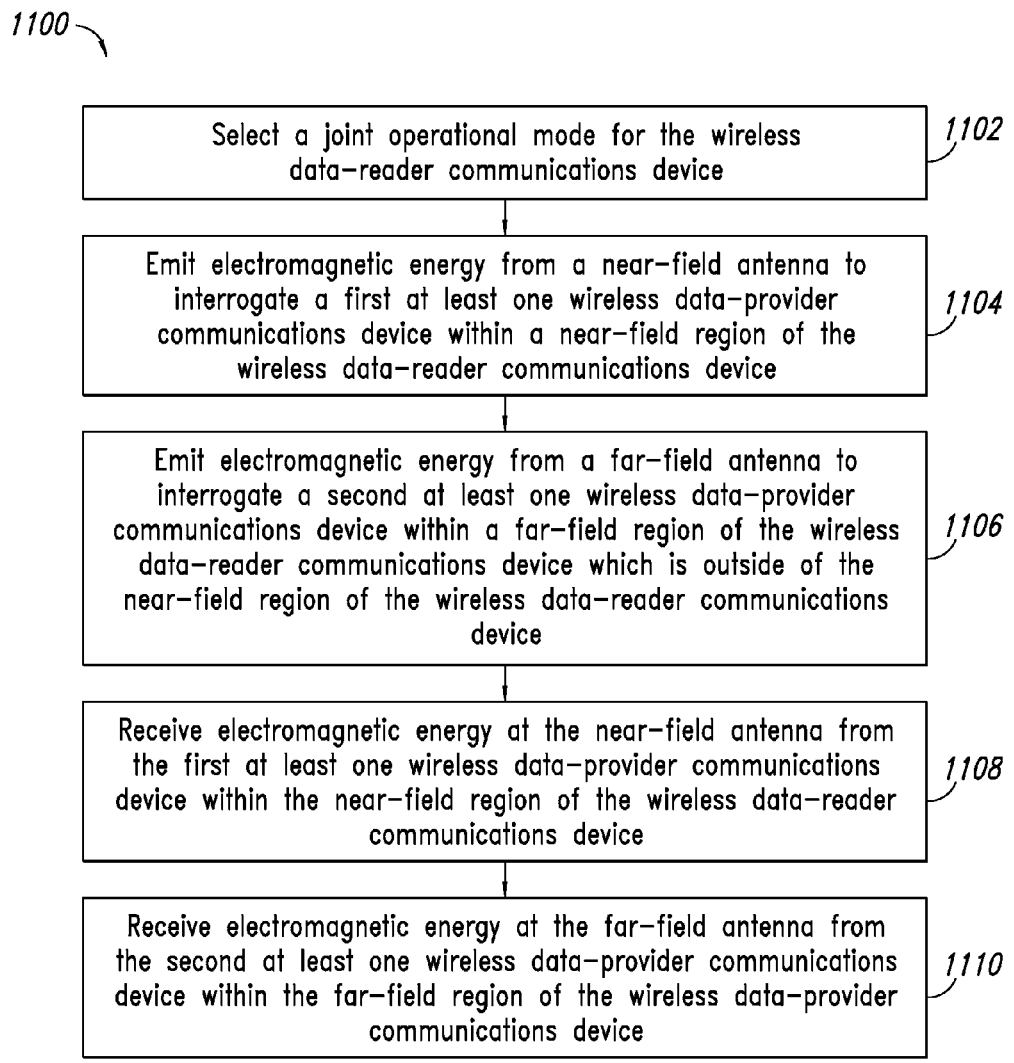
FIG. 11 is a flow diagram of another exemplary method of operating a wireless data-reader communications device that wirelessly reads data from wireless data-provider communications devices, according to one non-limiting illustrated embodiment.

FIG. 11 shows a method 1100 of operating a wireless data-reader communications device that wirelessly reads data from wireless data-provider communications devices, according to one illustrated embodiment.

At 1102, a joint operational mode for the wireless data-reader communications device is selected.

At 1104, the wireless data-reader communications device emits electromagnetic energy from a near-field antenna to interrogate at least one wireless data-provider communications device that is within a near-field region of the wireless data-reader communications device.

At 1106, the wireless data-reader communications device emits electromagnetic energy from a far-field antenna to interrogate at least one wireless data-provider communications device that is within a far-field region of the wireless data-reader communications device and that is outside of the near-field region of the wireless data-reader communications device.

At 1108, the wireless data-reader communications device receives electromagnetic energy at the near-field antenna from at least one wireless data-provider communications device within the near-field region of the wireless data-reader communications device.

At 1110, the wireless data-reader communications device receives electromagnetic energy at the far-field antenna from at least one wireless data-provider communications device that is within a far-field region of the wireless data-reader communications device and that is outside of the near-field region of the wireless data-reader communications device.

Figure 12:
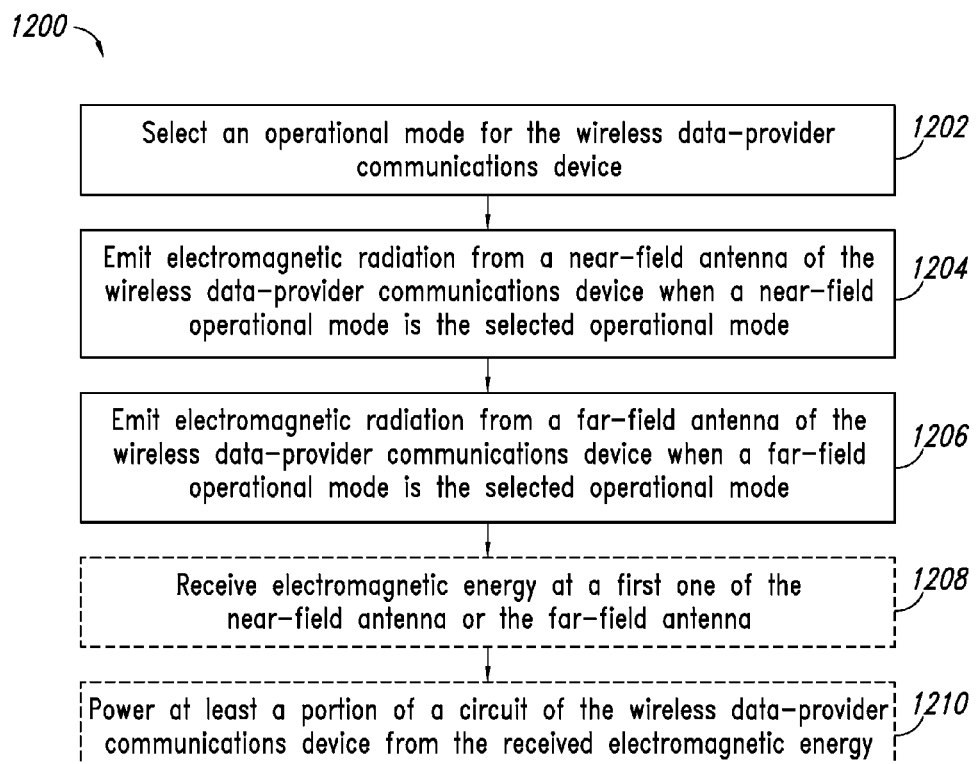
FIG. 12 is a flow diagram of an exemplary method of operating a wireless data-provider communications device that wirelessly sends data to a wireless data-reader communications device, according to one non-limiting illustrated embodiment.

FIG. 12 shows a method 1200 of operating a wireless data-provider communications device that wirelessly sends data to a wireless data-reader communications device, according to one illustrated embodiment.

At 1202, an operational mode for the wireless data-provider communications device is selected. The operational mode may be selected prior to, or concurrently with, the wireless data-provider communications device being activated and/or used for a purpose such as identifying an object. For example, prior to, or concurrently with a person attaching a wireless data-provider communications device to a good or packaging, the user may manually select an operational mode for the wireless data-provider communications device. Similarly, prior to or concurrently with a person attaching a wireless data-provider communications device to a good or packaging, the user may provide an electronic provider-mode command message to select an operational mode for the wireless data-provider communications device. In some embodiments, the operational mode of the wireless data-provider communications device may be reconfigured either manually and/or electronically via a provider-mode command message at any time.

At 1204, electromagnetic radiation is emitted from a near-field antenna of the wireless data-provider communications device when a near-field operational mode is the selected operational mode. The emitted electromagnetic radiation may be emitted as backscatter from the near-field antenna. The emitted electromagnetic radiation may be emitted in response to interrogation of the wireless data-provider communications device.

At 1206, electromagnetic radiation is emitted from a far-field antenna of the wireless data-provider communications device when a far-field operational mode is the selected operational mode. The emitted electromagnetic radiation may be emitted as backscatter from the far-field antenna. The emitted electromagnetic radiation may be emitted in response to interrogation of the wireless data-provider communications device.

At 1208, which may be optional, electromagnetic energy is received at a first one of the near-field antenna or the far-field antenna. In particular, if the selected operational mode is near-field operational mode, then the far-field antenna may receive the electromagnetic energy. On the other hand, if the selected operational mode is far-field operational mode, then the near-field antenna may receive the electromagnetic energy.

At 1210, which may be optional, at least a portion of a circuit of the wireless data-provider communications device is powered from the received electromagnetic energy.

Figure 13:
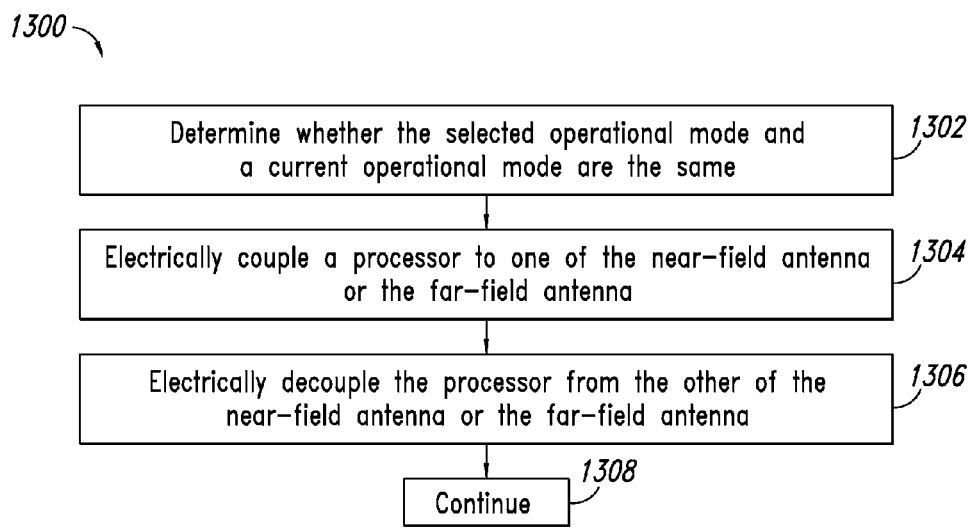
FIG. 13 is a flow diagram of an exemplary method of selecting an operational mode for a wireless data-provider communications device, according to one non-limiting illustrated embodiment.

FIG. 13 shows a method 1300 that may be implemented at block 1202 in selection of an operational mode, according to another illustrated embodiment.

At 1302, the wireless data-provider communications device determines whether the selected operational mode is the same as a current operational mode of the wireless data-provider communications device. If the selected operational mode is the same as the current operational mode, then the method continues at block 1308, otherwise, the method continues at block 1304.

If the current operational mode is near-field operational mode, then the wireless data-provider communications device employs the near-field antenna. However, if the current operational mode is far-field operational mode, then the wireless data-provider communications device employs the far-field antenna. Thus, when the current operational mode is different from the selected operational mode, the wireless data-provider communications device is reconfigured to employ the appropriate antenna.

At 1304, a processor is electrically coupled to a selected one of the near-field antenna or the far-field antenna. The selected one of the near-field antenna or the far-field antenna corresponds to the selected operational mode.

At 1306, the processor is electrically decoupled from the other one of the near-field antenna or the far-field antenna. For example, if the selected operational mode is far-field operational mode, then the near-field antenna is decoupled from the processor.

At 1308, the method continues. The method may continue at optional block 1204 or at block 1206.

FIG. 14 shows a method 1400 that may be implemented at block 1202 in selection of an operational mode, according to another illustrated embodiment.

At 1402, the wireless data-provider communications device wirelessly receives a provider-mode command that is indicative of an operational mode.

At 1404, the wireless data-provider communications device selects the operational mode for the wireless data-provider communications device based at least partially on the received provider-mode command.

FIG. 15 shows a method 1500 of operating a wireless data-provider communications device that wirelessly sends data to a wireless data-reader communications device, according to one illustrated embodiment.

At 1502, the wireless data-provider communications device selects a joint operational mode for a wireless data-reader communications device.

At 1504, the wireless data-provider communications device emits electromagnetic energy from a near-field antenna responsive to interrogation by a first wireless data-reader communications device, wherein the wireless data-provider communications device is within a near-field region of the first wireless data-reader communications device.

At 1506, the wireless data-provider communications device emits electromagnetic energy from a far-field antenna responsive to interrogation by a second wireless data-reader communications device, wherein the wireless data-provider communications device is within a far-field region of the second wireless data-reader communications device.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other wireless communications devices, not necessarily the exemplary wireless communications devices generally described above. In addition, the teachings provided herein of the various embodiments may be applied to any one, or combinations of, LF antennas, HF antennas, and UHF antennas.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wireless data-reader communications device, comprising:
    a near-field antenna-structure including a first near-field antenna configured to be near-field operable;
    a far-field antenna-structure including a far-field antenna configured to be far-field operable, the far-field antenna carrying the first near-field antenna;
    a processor in communication with the near-field antenna-structure and the far-field antenna-structure that executes instructions; and
    a memory in communication with the processor having instructions stored therein that cause the processor to interrogate a respective wireless data provider communications device with at least one of the near-field and the far-field antenna-structures.

2. The wireless data-reader communications device of claim 1, comprising:
    a power splitter/combiner that communicatively couples the processor to the near-field antenna-structure and to the far-field antenna-structure.

3. The wireless data-reader communications device of claim 1, comprising:
    a controllable switch that flips the wireless data-reader communications device between a near-field operational mode and a far-field operational mode, wherein in near-field operational mode the near-field antenna-structure is communicatively coupled to the processor and the far-field antenna-structure is communicatively decoupled from the processor, and wherein in far-field operational mode the near-field antenna-structure is communicatively decoupled from the processor and the far-field antenna-structure is communicatively coupled to the processor; and
    wherein the memory stores further instructions that cause the processor to:
    toggle the controllable switch from one of the near-field operational mode or the far-field operational mode to the other operational mode.

4. The wireless data-reader communications device of claim 1 wherein the wireless data-reader communications device conforms to at least one standard for a radio frequency identification reader that reads data from a radio frequency identification device.

5. The wireless data-reader communications device of claim 1, comprising:
a pair of antenna feedpoints communicatively coupled to the processor, wherein the first near-field antenna and the far-field antenna are electrically coupled in parallel to the pair of antenna feedpoints.

6. The wireless data-reader communications device of claim 1, comprising:
a pair of antenna feedpoints communicatively coupled to the processor, wherein the first near-field antenna and the far-field antenna are electrically coupled in series to the pair of antenna feedpoints.

7. The wireless data-reader communications device of claim 1 wherein the near-field antenna-structure includes a second near-field antenna carried by the far-field antenna, the first near-field antenna arranged having a central axis aligned in a first direction, the second near-field antenna arranged having a central axis aligned in a second direction that is different from the first direction.

8. The wireless data-reader communications device of claim 1 wherein the far-field antenna comprises a patch antenna with a first plate and the first near-field antenna comprises a coil antenna, which is carried by the first plate.

9. The wireless data-reader communications device of claim 1 wherein the near-field antenna-structure includes a second near-field antenna, the first and the second near-field antennas comprising first and second coil antennas, the far-field antenna comprises a dipole antenna that carries the first and the second coil antennas, the first coil antenna arranged having a central axis aligned in a first direction, the second coil antenna arranged having a central axis aligned in a second direction that is different from the first direction.

10. A wireless data-reader communications device, comprising:
a near-field antenna-structure including a first near-field antenna configured to be near-field operable;
a far-field antenna-structure including a far-field antenna configured to be far-field operable;
a processor in communication with the near-field antenna-structure and the far-field antenna-structure that executes instructions;
a memory in communication with the processor having instructions stored therein that cause the processor to interrogate a respective wireless data provider communications device with at least one of the near-field and the far-field antenna-structures; and
a switch configured to be physically manipulated by a user and configured to switch the wireless data-reader communications device between a near-field operational mode and a far-field operational mode, wherein in near-field operational mode, the near-field antenna-structure is communicatively coupled to the processor and the far-field antenna-structure is communicatively decoupled from the processor, and wherein in far-field operational mode, the near-field antenna-structure is communicatively decoupled from the processor and the far-field antenna-structure is communicatively coupled to the processor.

11. The wireless data-reader communications device of claim 10, comprising:
a pair of antenna feedpoints communicatively coupled to the processor, wherein the first near-field antenna and the far-field antenna are electrically coupled in parallel to the pair of antenna feedpoints, and wherein the far-field antenna carries the first near-field antenna.

12. The wireless data-reader communications device of claim 10, comprising:
a pair of antenna feedpoints communicatively coupled to the processor, wherein the first near-field antenna and the far-field antenna are electrically coupled in series to the pair of antenna feedpoints, and wherein the far-field antenna carries the first near-field antenna.

13. The wireless data-reader communications device of claim 10 wherein the near-field antenna-structure includes a second near-field antenna carried by the far-field antenna, the first near-field antenna arranged having a central axis aligned in a first direction, the second near-field antenna arranged having a central axis aligned in a second direction that is different from the first direction.

14. The wireless data-reader communications device of claim 10 wherein the far-field antenna comprises a patch antenna with a first plate and the first near-field antenna comprises a coil antenna, which is carried by the first plate.

15. A method of operating a wireless data-reader communications device that comprises a processor, a near-field antenna and a far-field antenna carrying the near-field antenna and that wirelessly reads data from wireless data-provider communications devices, comprising:
selecting an operational mode for the wireless data-reader communications device;
electrically coupling the processor of the wireless data-reader communications device to at least one of the near-field antenna carried by the far-field antenna and the far-field antenna;
interrogating at least one wireless data-provider communications device with the near-field antenna when a near-field operational mode is the selected operational mode; and
interrogating at least one wireless data-provider communications device with the far-field antenna when a far-field operational mode is the selected operational mode.

16. The method of claim 15 wherein selecting an operational mode for the wireless data-reader communications device includes:
determining whether the selected operational mode and a current operational mode are the same;
electrically coupling the processor to one of the near-field antenna or the far-field antenna; and
electrically decoupling the processor from the other of the near-field antenna or the far-field antenna.

17. The method of claim 15 wherein selecting an operational mode for the wireless data-reader communications device includes:
selecting a joint operational mode for the wireless data-reader communications device, and further comprising:
emitting electromagnetic energy from the near-field antenna to interrogate a first at least one wireless data-provider communications device within a near-field region of the wireless data-reader communications device; and
emitting electromagnetic energy from the far-field antenna to interrogate a second at least one wireless data-provider communications device within a far-field region of the wireless data-reader communications device which is outside of the near-field region of the wireless data-reader communications device.

18. The method of claim 17, further comprising receiving electromagnetic energy at the near-field antenna from the first at least one wireless data-provider communications device within the near-field region of the wireless data-reader communications device; and receiving electromagnetic energy at the far-field antenna from the second at least one wireless data-provider communications device within the far-field region of the wireless data-reader communications device.

19. The method of claim 15 wherein selecting an operational mode for the wireless data-reader communications device includes:

wirelessly receiving a reader-mode command indicative of an operational mode via a third antenna that is different from both the near-field antenna and the far-field antenna; and selecting the operational mode for the wireless data-reader communications device based at least partially on the received reader-mode command.

20. The method of claim 15, further comprising:

wirelessly providing a provider-mode command indicative of an operational mode of at least one wireless data-provider communications device.

* * * * *

UNITED STATES PATENT AND TRADEMARK OFFICE
CERTIFICATE OF CORRECTION

| | | |
|---|---|---|
| PATENT NO. | : 7,843,347 B2 | Page 1 of 1 |
| APPLICATION NO. | : 12/022911 | |
| DATED | : November 30, 2010 | |
| INVENTOR(S) | : Pavel Nikitin et al. | |

It is certified that error appears in the above-identified patent and that said Letters Patent is hereby corrected as shown below:

Title Page
Item 73
"Intermac IP Corp., Everett, WA (US)" should read, --Intermec IP Corp., Everett, WA (US)--.

Signed and Sealed this
First Day of February, 2011

David J. Kappos
*Director of the United States Patent and Trademark Office*